US 12,248,232 B2

(12) United States Patent
Gwalani (10) Patent No.: US 12,248,232 B2
(45) Date of Patent: Mar. 11, 2025

(54) MULTIFUNCTIONAL HANDHELD BLUETOOTH DEVICE

(71) Applicant: Freewell Industry Company Limited, Hong Kong (HK)

(72) Inventor: Hitesh Gopal Gwalani, Nagpur (IN)

(73) Assignee: Freewell Industry Company Limited, Hong Kong (HK)

( * ) Notice: Subject to any disclaimer, the term of this patent is extended or adjusted under 35 U.S.C. 154(b) by 116 days.

(21) Appl. No.: 18/067,028

(22) Filed: Dec. 16, 2022

(65) Prior Publication Data
US 2024/0201568 A1    Jun. 20, 2024

(51) Int. Cl.
| G03B 17/56 | (2021.01) |
| F16M 13/04 | (2006.01) |
| H04M 1/72412 | (2021.01) |
| H04W 4/80 | (2018.01) |

(52) U.S. Cl.
CPC .......... *G03B 17/561* (2013.01); *F16M 13/04* (2013.01); *G03B 17/563* (2013.01); *H04M 1/72412* (2021.01); *H04M 2250/52* (2013.01); *H04W 4/80* (2018.02)

(58) Field of Classification Search
None
See application file for complete search history.

(56) References Cited

U.S. PATENT DOCUMENTS

| 9,473,606 | B1 * | 10/2016 | Sumida | H04M 1/72409 |
| D799,465 | S  * | 10/2017 | Sukphist | D14/253 |
| 10,830,390 | B1 * | 11/2020 | Miller | A45D 24/10 |
| 11,044,353 | B1 * | 6/2021 | Goldburt | G06F 1/1686 |
| 2019/0064638 | A1 * | 2/2019 | O'Neill | G03B 17/561 |
| 2019/0162359 | A1 * | 5/2019 | Kundu | G03B 7/00 |

FOREIGN PATENT DOCUMENTS

| CN | 206329895 U | * | 7/2017 | |
| CN | 207218805 U | * | 4/2018 | G03B 17/561 |
| CN | 109639871 A | * | 4/2019 | G03B 17/56 |
| CN | 111174070 A | * | 5/2020 | |
| CN | 111853435 A | * | 10/2020 | |
| CN | 112330943 A | * | 2/2021 | |
| CN | 213576436 U | * | 6/2021 | |
| CN | 213637855 U | * | 7/2021 | H04M 1/04 |
| CN | 213954840 U | * | 8/2021 | |
| CN | 216046506 U | * | 3/2022 | |
| CN | 220980966 U | * | 5/2024 | |
| WO | WO-2015192207 A1 | * | 12/2015 | F16M 11/10 |
| WO | WO-2020211072 A9 | * | 12/2020 | F16B 2/12 |

* cited by examiner

*Primary Examiner* — Rodney E Fuller (57) ABSTRACT

A multifunctional handheld Bluetooth beat aid is disclosed. The multifunctional handheld Bluetooth beat aid comprises a clamping assembly comprising a retractable clamping member and a fixed member. The retractable clamping member configured to clamp a mobile device comprises a first clamping portion orthogonal to a second clamping portion. The retractable clamping member is configured to move away from, and towards the fixing member of the clamping assembly. Further, a fixed seat is rotatably connected to the fixed member. A hollow handle comprises a telescopic rod rotatably connected to the fixed seat and a Bluetooth controller provided towards a second telescopic end of the hollow handle.

10 Claims, 8 Drawing Sheets

MULTIFUNCTIONAL HANDHELD BLUETOOTH DEVICE

BACKGROUND

Unless otherwise indicated herein, the materials described in this section are not prior art to the claims in this application and are not admitted to being prior art by inclusion in this section.

FIELD OF INVENTION

The subject matter in general relates to a utility model of Bluetooth selfie sticks aids. More particularly, but not exclusively, the subject matter pertains to a multifunctional handheld Bluetooth device.

DISCUSSION OF RELATED ART

A shooting aid, as the name suggests, is a device used to assist users in taking pictures. Most of the conventional shooting aids are in the form of selfie sticks, which offer several advantages to users such as user-convenience and in terms of carrying and using them. However, the conventional shooting aids are not portable, difficult to be adjusted flexibly and fail to meet requirements of current users and existing issues.

In view of the foregoing discussion, there is a need to provide an improved multifunctional handheld Bluetooth device that will overcome the foresaid drawbacks of the existing art.

SUMMARY

In an embodiment, a multifunctional handheld Bluetooth device is disclosed. The Bluetooth device comprises a clamping assembly comprising a retractable clamping member and a fixed member. The retractable clamping member configured to clamp a mobile device comprises a first clamping portion and a second clamping portion. The first clamping portion is orthogonal to the second clamping portion. The retractable clamping member is configured to move away from, and towards the fixing member of the clamping assembly. Further, the fixed member of the clamping assembly is rotatably connected to the fixed seat. A hollow handle comprises a telescopic rod rotatably connected to the fixed seat and a Bluetooth controller which is provided towards a second handle end.

BRIEF DESCRIPTION OF DRAWINGS

This disclosure is illustrated by way of example and not limitation in the accompanying figures. Elements illustrated in the figures are not necessarily drawn to scale, in which like references indicate similar elements and in which.

Reference numerals of components of the utility model of multifunctional handheld Bluetooth device 100 are provided hereunder:

a hollow handle 102;
a clamping assembly 104;
a fixed seat 106;
a Bluetooth controller 108;
a first handle end 110;
a second handle end 112;
an upper side 202;
a lower side 204;
a retractable clamping member 206;
a fixed member 208;
a first clamping portion 210;
a second clamping portion 212;
a first step 218;
a second step 220;
a guide member 222;
a cold shoe interface 224;
a spring connection block 302;
a fixing plate 304;
a sliding groove 306;
a silicone pad 308;
a pair of springs 310;
a sliding member 312;
a first fixing side 314;
a second fixing side 316;
a protective silicone pad 318;
a telescopic rod 402;
a first telescopic end 404;
a second telescopic end 406;
a first side 408;
a second side 410;
first damping grooves 412;
a second damping groove 414;
a damping ring 416;
a pair of damping pins 418;
a damping shaft 420;
a first member 422;
a second member 424; and
a Bluetooth controller insertion slot 502.

DETAILED DESCRIPTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Referring to FIGS. 1-6, a multifunctional handheld Bluetooth device 100 is disclosed, in accordance with an embodiment. The multifunctional handheld Bluetooth device 100 may comprise a hollow handle 102, a clamping assembly 104, a fixed seat 106 and a Bluetooth controller 108.

Figure 1:
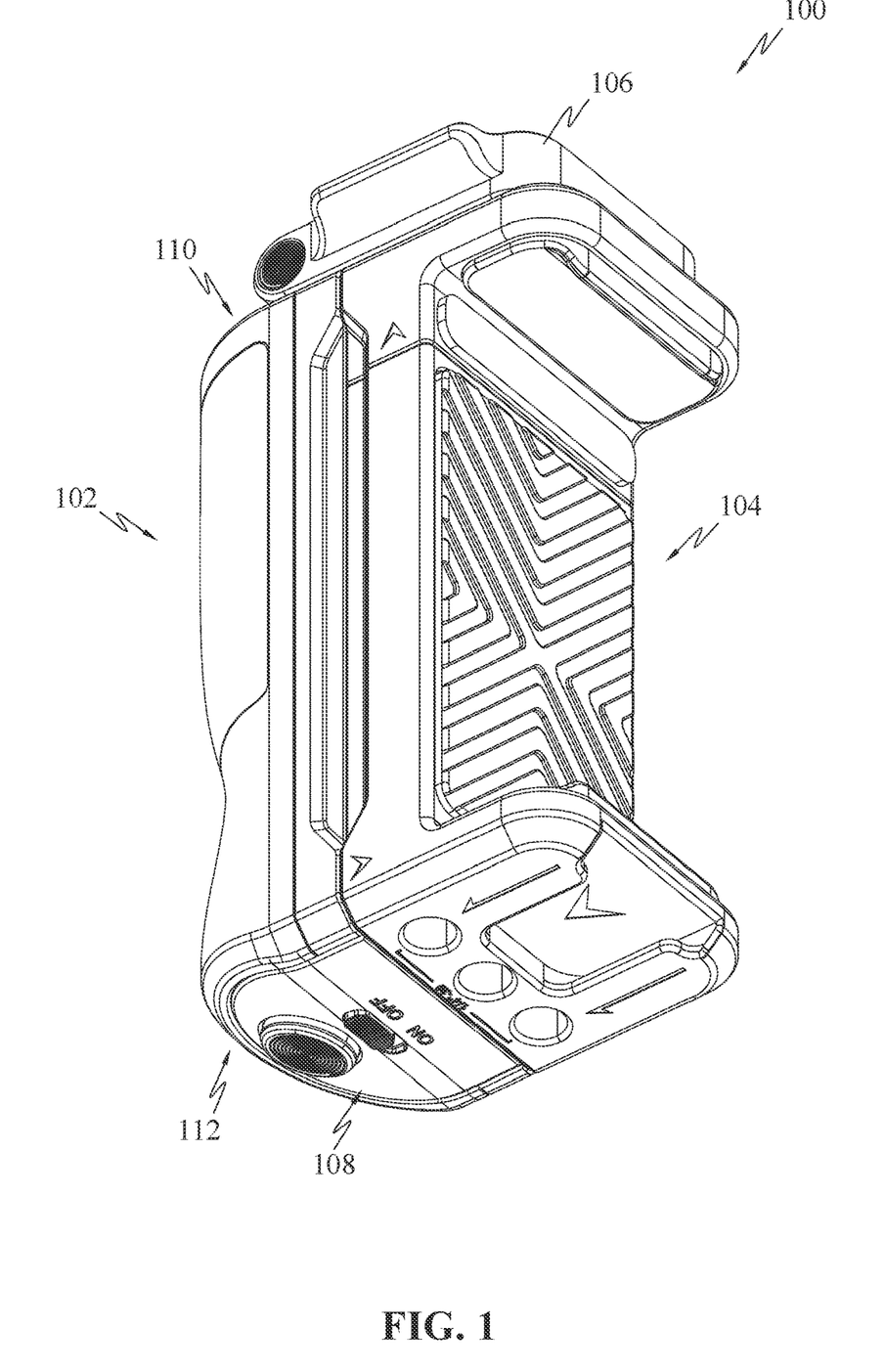
FIG. 1 illustrates a multifunctional handheld Bluetooth shooting aid 100, in accordance with an embodiment.

Now referring specifically to FIG. 1, a perspective view of a multifunctional handheld Bluetooth device 100 in an idle state (non-operative state having a folded configuration) is illustrated. In the idle state, the hollow handle 102 may be configured opposite to the clamping assembly 104. That is to say, the hollow handle 102 may be folded such that the hollow handle 102 is positioned below the clamping assembly 104. Further, the fixed seat 106 may be provided towards a first handle end 110 of the hollow handle 102.

In an embodiment, the Bluetooth controller 108 may be installed towards a second handle end 112 of the hollow handle 102. The Bluetooth controller 108 may include a Bluetooth switch and a Bluetooth button, and internal settings powered by batteries. The Bluetooth controller 108 may be used to remotely control mobile phones for shooting via. Bluetooth. It may be noted that the electronic components in the Bluetooth controller 108 and the like are general standard components or components known to those skilled in the art, and their structures and principles are accessible to those skilled in the art. Therefore, from technical manuals or through conventional experimental methods, when the device is not in operation, those electrical components may be connected through wires respectively. The instant connection may be a well-known technology in the state of art.

Figure 2A:
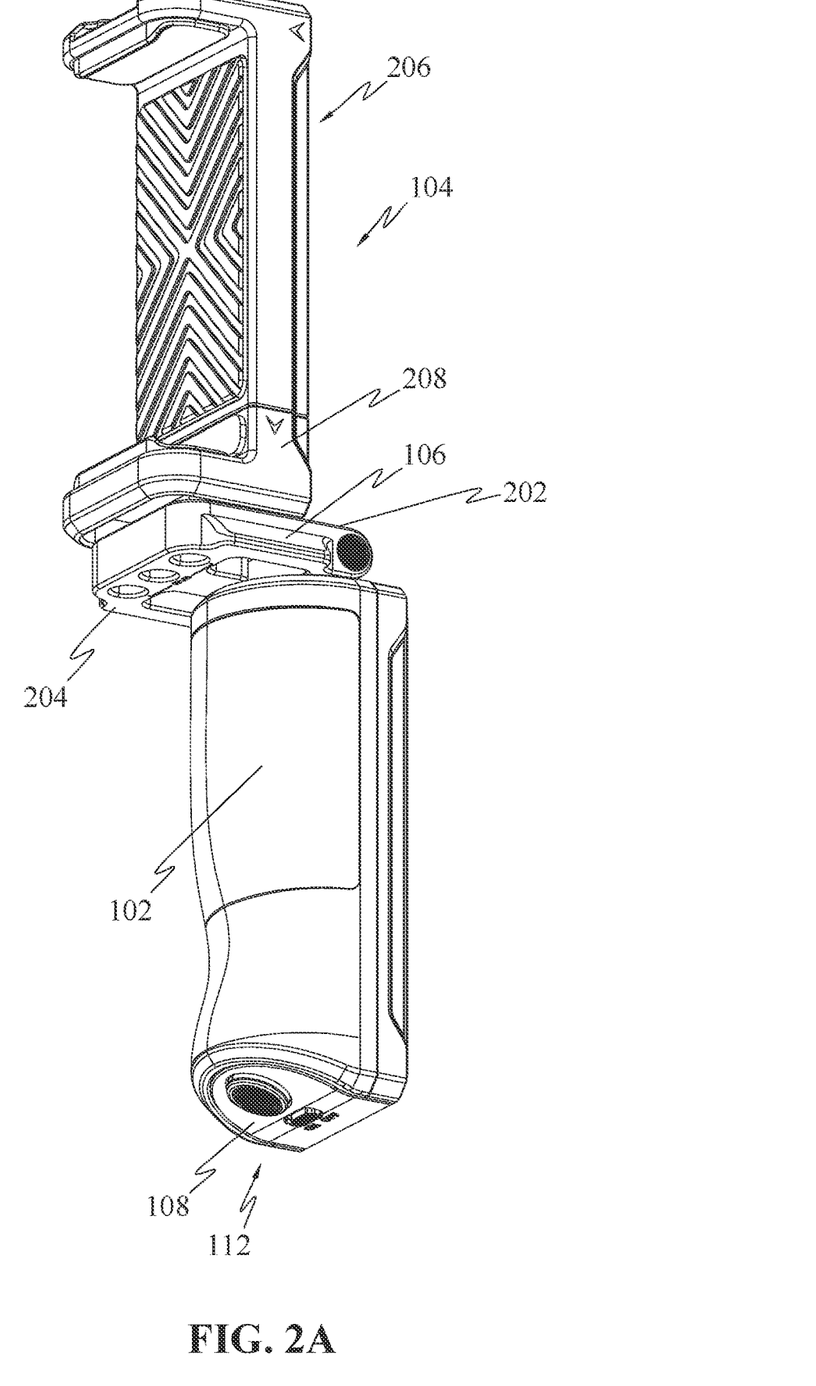
FIG. 2A illustrates 180 degrees rotation of a hollow handle 102 with respect to a clamping assembly 104 of the multifunctional handheld Bluetooth shooting aid 100, in accordance with an embodiment.
Figure 2B:
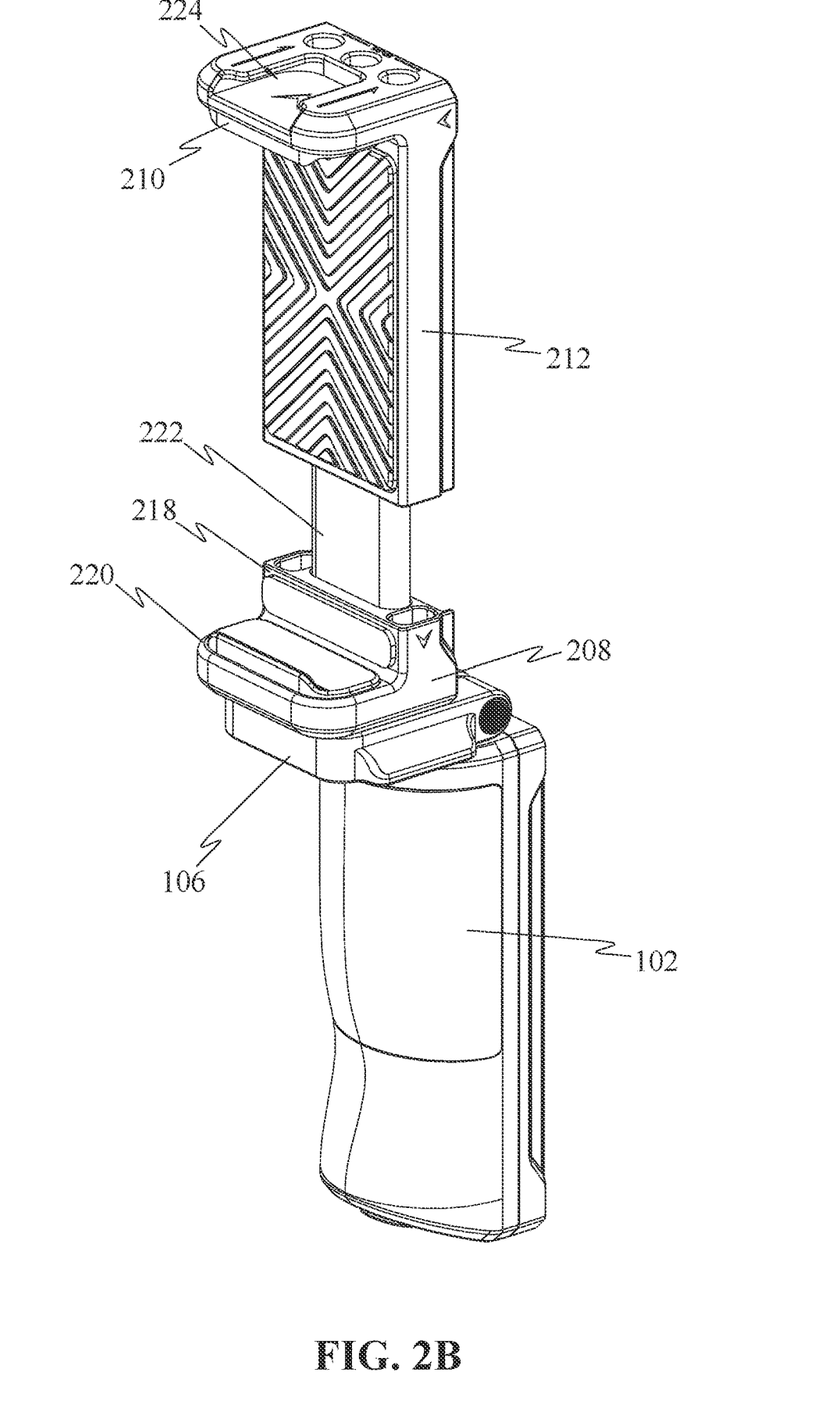
FIG. 2B illustrates displacement of a retractable clamping member 206 from a fixed member 208 of the clamping assembly 104, in accordance with an embodiment.

Referring to FIGS. 2A-2B, the fixed seat 106 may comprise an upper side 202 and a lower side 204. The fixed seat 106 may be rotatably connected to the clamping assembly 104. Further, the fixed seat 106 may also be rotatably connected to the hollow handle 102. The coupling of the clamping assembly 104 to the fixed seat 106 and the hollow handle 102 is explained in detail in FIG. 4.

In an embodiment, the clamping assembly 104 may include a retractable clamping member 206 for clamping a mobile phone, and a fixed member 208. The retractable clamping member 206 of the clamping assembly 104 may be configured to move away from, and towards the fixed member 208 of the clamping assembly 104. Referring to FIG. 2A, the hollow handle 102, when rotated about an angle 180 degree with respect to the clamping assembly 104, the hollow handle 102 may be displaced from its previous position of FIG. 1. The hollow handle 102 may be positioned below the fixed seat 106.

In an embodiment, the retractable clamping member 206 may comprise a first clamping portion 210 and a second clamping portion 212. The first clamping portion 210 may be orthogonal to the second clamping portion 212 thus forming an L shape configuration of the retractable clamping member 206.

In an embodiment, the first clamping portion 210 may have a cold shoe interface 224 that may be used for connecting accessories such as fill light and a microphone In an embodiment, the fixed member 208 may be provided as a step-like configuration comprising a first step 218 and a second step 220. The second step 220 may be provided lower to the first step 218.

In an embodiment, the clamping assembly 104 may comprise a guide member 222. The guide member 222 may comprise a first guide end and a second guide end. The first guide end may be embedded inside the fixed member 208, while the second guide end may extend away from the fixed member 208.

Referring to FIG. 2A, the retractable clamping member 206 may completely enclose the guide member 222, when the retractable clamping member 206 is in contact with the fixed member 208. Alternatively, at least a portion of the guide member 222 may be exposed, when the retractable clamping member 206 moves away from the fixed member 208. In other words, the retractable clamping member 206 may not completely enclose the guide member 222 as seen in FIG. 2A.

Figure 3A:
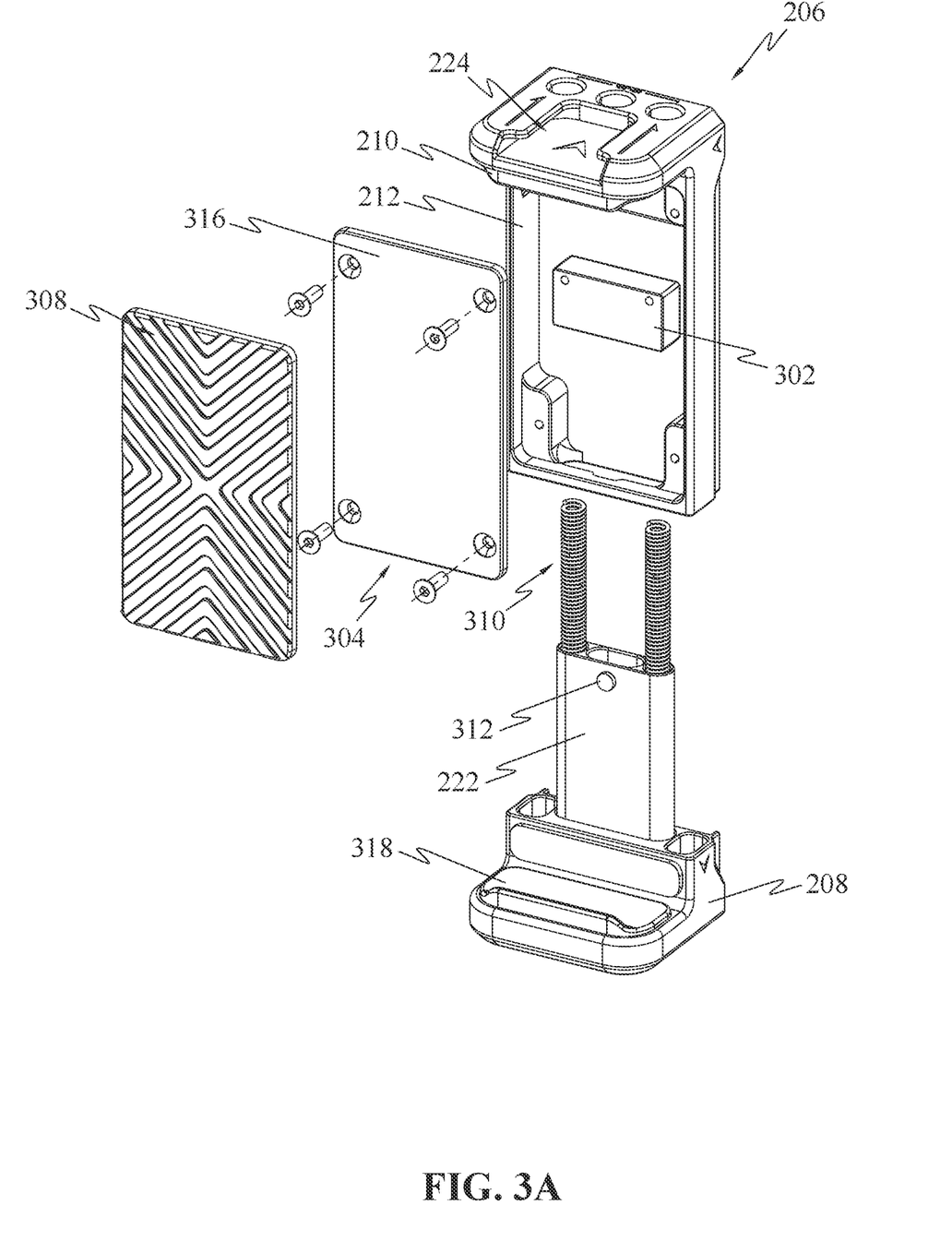
FIGS. 3A-3B illustrate exploded views of the clamping assembly 104, in accordance with an embodiment.
Figure 3B:
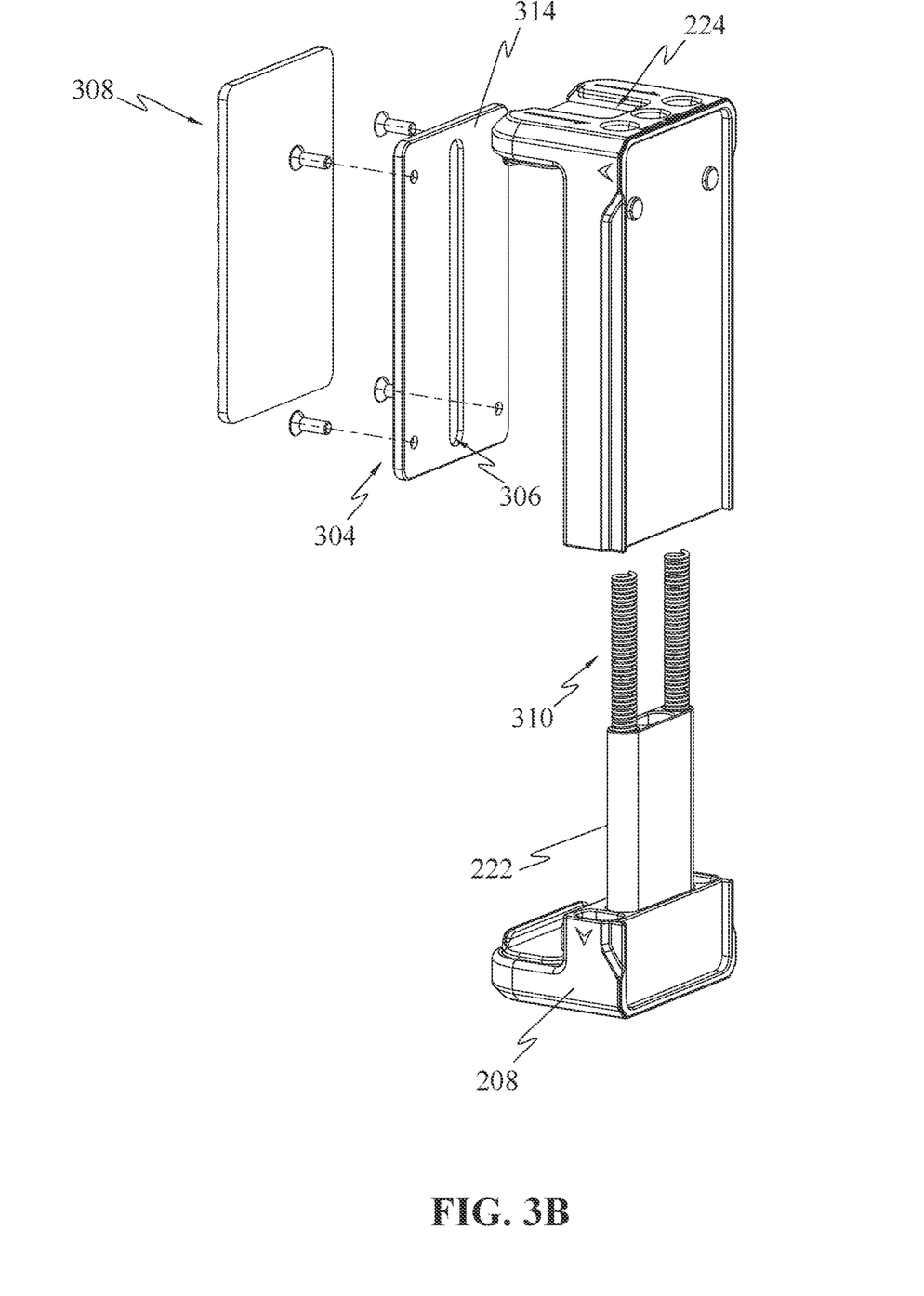

Referring to FIGS. 3A-3B, exploded views of the clamping assembly 104 may be illustrated, in accordance with an embodiment. The clamping assembly 104 may comprise a fixing plate 304 and a silicone pad 308.

In an embodiment, the fixing plate 304 may be rectangular in shape comprising four corners, a first fixing side 314 and a second fixing side 316.

In an embodiment, the fixing plate 304 may be fastened to the second clamping portion 212 of the retractable clamping member 206 through a plurality of fastening members. The fastening members may be screws that may pass through a plurality of through holes defined at the corners of the fixing plate 304, which are received by a plurality of holes defined on the second clamping portion 212.

In an embodiment, a sliding groove 306 may be defined on the first fixing side 314 along a vertical direction (refer FIG. 3B).

In an embodiment, the silicone pad 308 may be bonded to the second fixing side 316 of the fixing plate 304. The silicone pad 308 may provide anti-slip effect to a back portion of the mobile phone, when the mobile phone gets clamped to the clamping assembly 104, thereby ensuring that the mobile phone doesn't not get scratched.

In an embodiment, a protective silicone pad 318 may be provided on the second step 220 of the clamping assembly 104. When the mobile phone is clamped, the protective silicone pad 318 may provide support to the mobile phone.

In an embodiment, an interior of the second clamping portion 212 of the retractable clamping member 206 may define a hollow space in which a spring connection block 302 may be provided.

In an embodiment, the guide member 222 may include a pair of springs 310 and a sliding member 312. The spring connection block 302 may be configured to limit the movement of the pair of springs 310.

When the multifunctional handheld Bluetooth device 100 is in idle state or not in an operative state, the pair of springs 310 are in a retracted position. That is to say, the springs 310 may be embedded within the guide member 222. Alternatively, when the multifunctional handheld Bluetooth device 100 is in the operative state, the retractable member 206 moves away from the fixed member 208. The sliding member 312 may slide over the sliding groove 306 resulting in the movement of at least a portion of the springs 310 towards the spring connection block 302.

Figure 4:
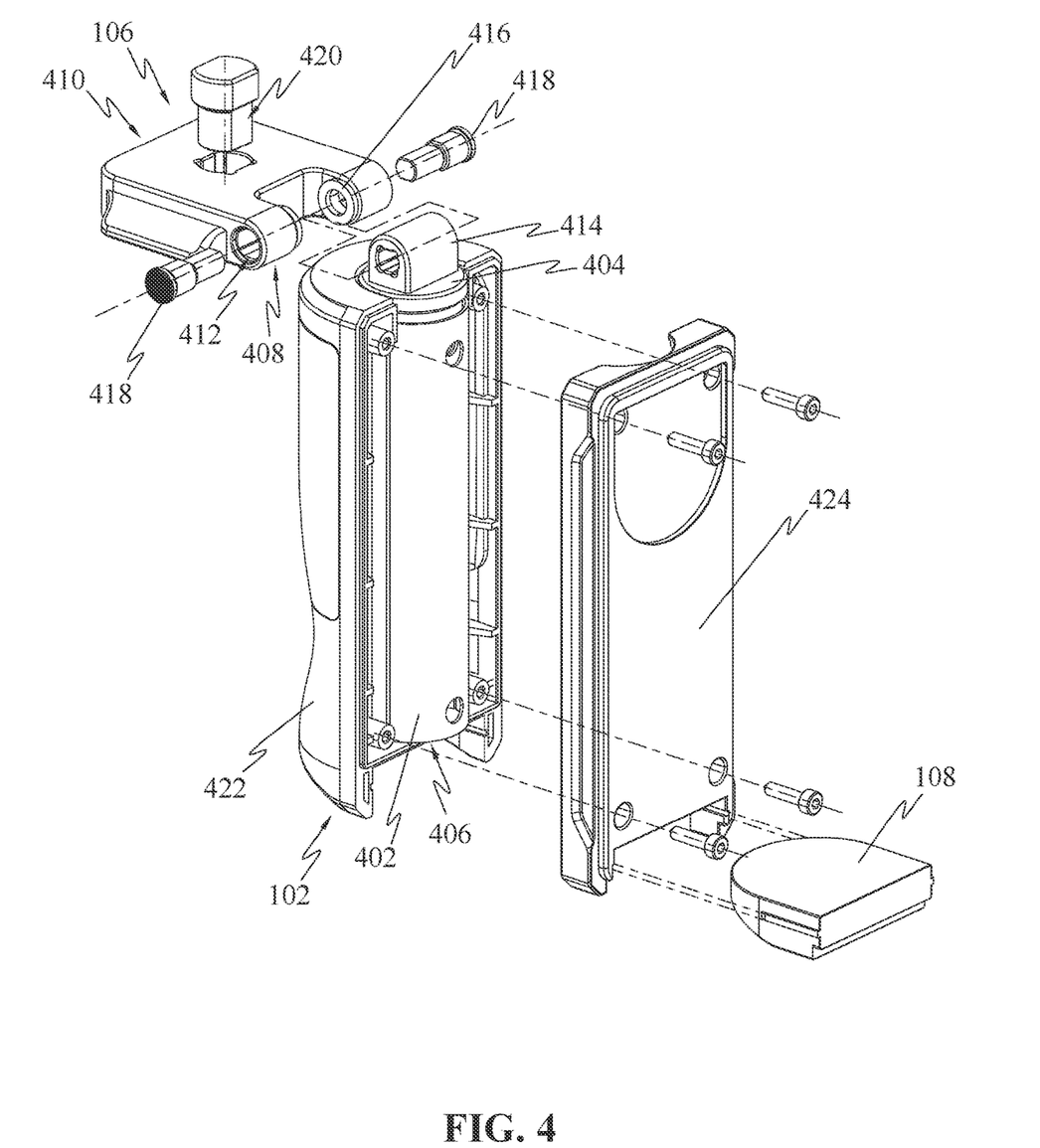
FIG. 4. illustrates an exploded view of the coupling of a hollow handle 102 to a fixed seat 106 of the multifunctional handheld Bluetooth shooting aid 100, in accordance with an embodiment.

Referring to FIG. 4, an exploded view of the hollow handle 102 of the multifunctional handheld Bluetooth device 100 is provided, in accordance with an embodiment. The hollow handle 102 may comprise a first member 422 and a second member 424. A telescopic rod 402 may be disposed between the first member 422 and the second member 424 of the hollow handle 102. The first member 422 may be coupled to the second member 424 by fasteners. The fasteners may be a screw or any type of fasteners that enables the engagement of the first member 422 and the second member 424. The first member 422 and the second member 424 may define a plurality of holes. The fastening members that pass through the holes defined on the second member 424 may be further received by the holes defined on a rear side of the first member 422 to enable the coupling of the first member 422 and the second member 424 of the hollow handle 102.

In an embodiment, the telescopic rod 402 may comprise a first telescopic end 404 and a second telescopic end 406. A second damping groove 414 may be provided at the first telescopic end 404 of the telescopic rod 402.

In an embodiment, the first telescopic end 404 may be operable to extend from the hollow handle 102, based on requirements by users. The second telescopic end 406 may reside inside the hollow handle 102. The telescopic rod 402 adopts a hidden design to make its usage convenient for users. The users may be able to adjust the telescopic rod 402 according to their needs, for instance, obtaining a wide-angle selfie. Further, the first telescopic end 404 may be rotatably coupled to the fixed seat 106.

In an embodiment, the fixed seat 106 may further comprise a first side 408 and a second side 410. The first side 408 may face the hollow handle 102, while the second side 410 faces away from the hollow handle 102. The first side 410 of the fixed seat 106 may be provided with a pair of damping grooves 412. Each of the damping grooves 412 may be opposite to each other and spaced apart defining a gap.

In an embodiment, the second damping groove 414 may be provided between the first damping grooves 412 and may be coupled to the first damping grooves 412.

In an embodiment, a damping ring 416 may be provided between the first damping grooves 412 and the second damping groove 414.

In an embodiment, the damping ring 416 may not be a part of the fixed seat 106 and may be externally introduced between the between the first damping grooves 412 and the second damping groove 414. Alternatively, the damping ring 416 may be a part of the fixed seat 106.

In an embodiment, two damping rings 416 may be provided between the first damping grooves 412 and the second damping groove 414.

In an embodiment, a pair of damping pins 418 may be provided such that, each of the damping pins 418 may be inserted into the second damping groove 414 through the first damping grooves 412 and the damping ring 416. The instant insertion ensures the clamping of the fixed seat 106 with the hollow handle 102. Further, such engagement enables the hollow handle 102 and the fixing seat 106 to turn vertically about an angle between 0°-180°. That is to say the movement in the vertical direction 0°-180° enables the damping pins 418 to realize damping effect when the hollow handle 102 rotates at a certain angle, thereby maintaining the stability of overall structure after adjustment.

Further, in an embodiment, a damping shaft 420 may be provided on the fixed seat 106. The damping shaft 420 may be configured to rotatably couple the clamping assembly 104 to the fixed seat 106 to realize 360° horizontal rotation of the clamping assembly 104.

Figure 5:
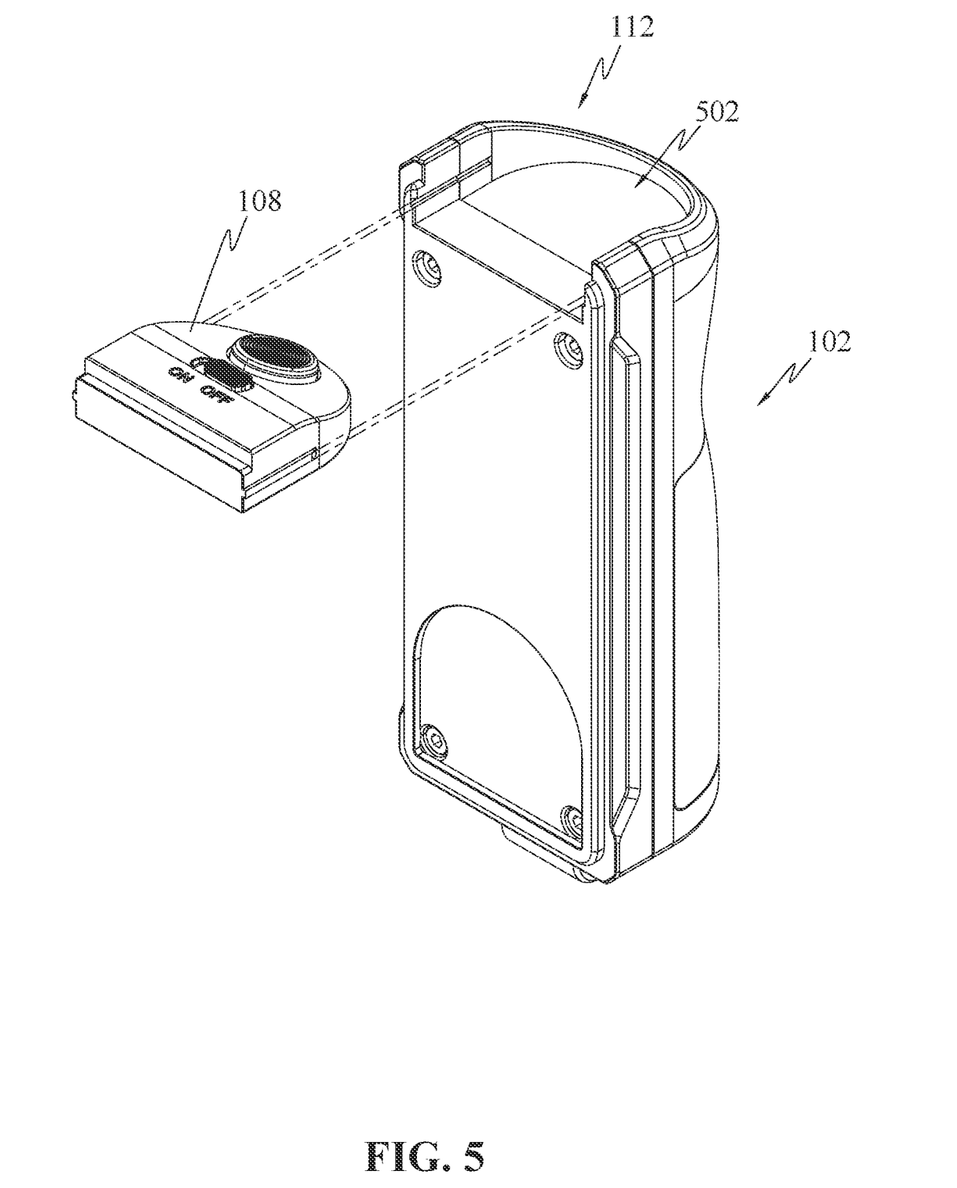
FIG. 5 illustrates a bottom perspective view of the hollow handle 102 in accordance with an embodiment.

FIG. 5 illustrates a bottom perspective view of the hollow handle 102 in accordance with an embodiment. Towards the second end of the hollow handle 102, a Bluetooth controller insertion slot 502 may be provided. The Bluetooth Controller 108 may be detachably plugged and attached to the Bluetooth controller insertion slot 502. Likewise. Bluetooth controller 108 can be removed from the Bluetooth controller insertion slot 502, thereby making convenient for users to control by hand.

Figure 6:
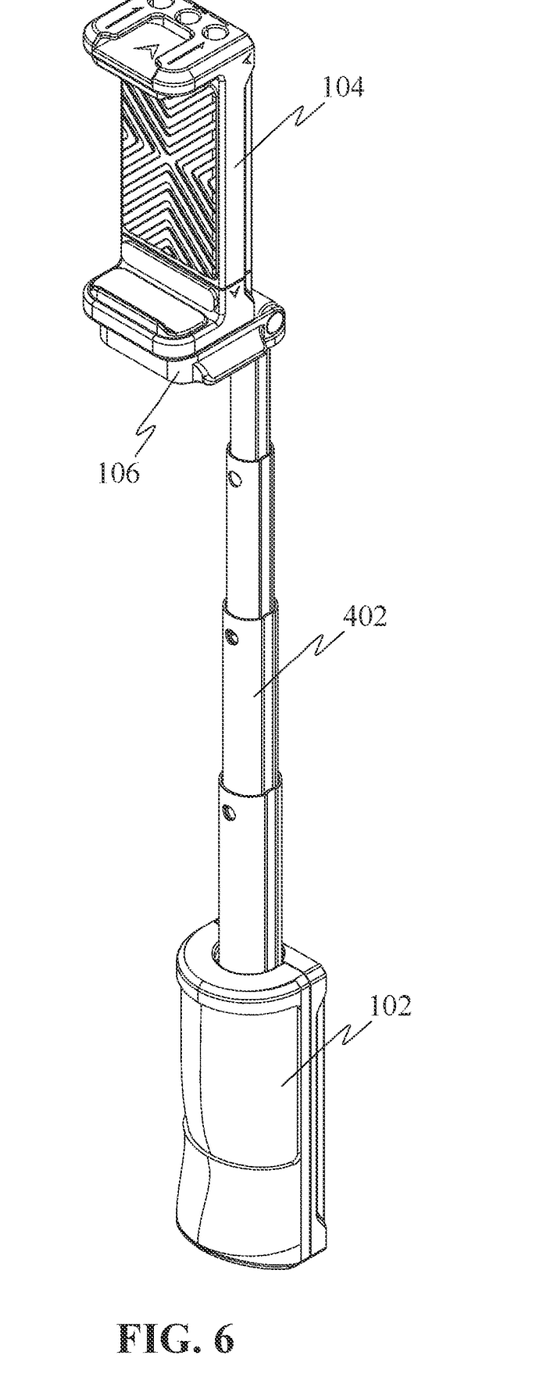
FIG. 6 illustrates an extended telescopic rod 402, in accordance with an embodiment.

Now referring to FIG. 6, the extended telescopic rod 402 may be illustrated, in accordance with an embodiment. When a wide-angle selfie is required, the hidden telescopic rod 402 may be extended from the hollow handle 102, so that better wide-angle selfie can be captured. Further, the telescopic rod 402 may be hidden within the hollow handle 102 as shown in FIGS. 1, 2A and 2B, respectively.

In operation of the multifunctional handheld Bluetooth device 100, initially, the clamping assembly 104 is vertically flipped (refer FIG. 2A) to a suitable angle. The retractable clamping member 206 of the clamping assembly 104 may be moved away from the fixed member 208 by pulling the retractable clamping member 206 away from the fixed member 208, the mobile phone may now be placed on the clamping assembly 104 (refer FIG. 2B). After the placement of the mobile phone, the retractable clamping member 206 is released and hence, the pair of springs 310 may be released. That is to say, the pair of springs 310 may move away from the spring connection block 302. A restoring force thereby may be generated by the pair of springs 310 as a result of the retraction of the retractable clamping member 206, which clamps the mobile phone. Consequently, the retractable clamping member 206 may be in contact with the fixed member 208 (refer FIG. 2A). Further, in order to adjust the angle of the mobile phone, the hollow handle 102 may be rotated as per requirements by users.

The beneficial effects of the multifunctional hand-held Bluetooth device are as follows: The multifunctional handheld Bluetooth device can be conveniently held and controlled by users through the mechanism of detachable Bluetooth controller, the telescopic rod, the fixed seat, the hollow clamping assembly which are configured in the multifunctional hand-held Bluetooth device. Further, the cooperation of the hollow clamping assembly supplemented by the cooperation of the damping shaft enables the multifunctional handheld Bluetooth device to rotate in multiple directions according to the needs of the user. This configuration enables users in free switching between horizontal and vertical shooting. The operation of the multifunctional handheld Bluetooth device is made simpler, easier to carry and convenient for usage.

In an embodiment, the basic principles, main features and advantages of the present invention have been shown and described above. It should be understood by those who skilled in the art that the present invention is not limited by the above-mentioned embodiments. The above-mentioned embodiments and descriptions only illustrate the principle of the present invention. It will be evident that various changes and improvements may be made to these embodiments without departing from the spirit and scope of the present invention. There will be various changes and improvements in the new model, which will fall within the scope of the claimed invention. The claimed scope of the present invention is defined by the appended claims and their equivalents. Accordingly, the specification and drawings are to be regarded in an illustrative rather than a restrictive sense.

What is claimed is:

1. A multifunctional handheld Bluetooth device comprising:

a clamping assembly comprising a retractable clamping member, a fixing plate, a guide member and a fixed member, wherein,     the retractable clamping member configured to clamp a mobile device comprises a first clamping portion and a second clamping portion, wherein:

the first clamping portion is orthogonal to the second clamping portion; and         the second clamping portion comprises a spring connection block; and         the second clamping portion defines a space for housing the guide member and the spring connection block;

the retractable clamping member is configured to move away from, and towards the fixed member of the clamping assembly;

at least one sliding groove is defined along a longitudinal direction, on a first side of the fixing plate wherein, the fixing plate is configured to be detachably fastened to the second clamping portion such that the first side of the fixing plate faces the space; and     the guide member comprises a pair of springs and a sliding member wherein:

the sliding member protrudes away from a surface of the guide member;

the sliding member is configured to be operably received by the sliding groove;

the sliding member is configured to traverse within the sliding groove as the retractable clamping member moves away from, or towards the fixed member of the clamping assembly, thereby resulting in a movement of at least a portion of the pair of springs; and         the spring connection block is configured to limit the movement of the pair of springs;

a fixed seat rotatably connected to the fixed member; and a hollow handle comprising:

a telescopic rod rotatably connected to the fixed seat; and     a Bluetooth controller provided towards a second handle end of the hollow handle.

2. The multifunctional handheld Bluetooth device according to claim 1, wherein a silicon pad is bonded to a second fixing side of the fixing plate.

3. The multifunctional handheld Bluetooth device according to claim 1, wherein the guide member comprises:

a first guide end disposed within the fixed member; and a second guide end extending away from the fixed member.

4. The multifunctional handheld Bluetooth device according to claim 1, wherein the fixed seat comprises a damping shaft configured to rotatably connect the fixed member of the clamping assembly to the fixed seat.

5. The multifunctional handheld Bluetooth device according to claim 1, wherein the telescopic rod is disposed between a first member and a second member of the hollow handle.

6. The multifunctional handheld Bluetooth device according to claim 1, wherein the telescopic rod comprises a first telescopic end extending away from the hollow handle and a second telescopic end residing inside the hollow handle, when the telescopic rod is in an extended position.

7. The multifunctional handheld Bluetooth device according to claim 1, wherein towards the second handle end of the hollow handle, a Bluetooth controller insertion slot is provided, such that, the Bluetooth controller is detachably plugged and fixed to the Bluetooth controller insertion slot.

8. The multifunctional handheld Bluetooth device according to claim 1, wherein,     a pair of first damping grooves are provided at a first fixed side of a fixed seat; and     a second damping groove is mounted on the telescopic rod and installed between the first damping grooves such that each of a pair of damping pins are received by the second damping groove which passes through the first damping grooves to enable the coupling of the fixed seat to the hollow handle.

9. The multifunctional handheld Bluetooth device according to claim 8, wherein a damping ring is provided between the first damping grooves and the second damping groove.

10. The multifunctional handheld Bluetooth device according to claim 1, wherein a cold shoe interface is provided on the first clamping portion.

\* \* \* \* \*